United States Patent [19]
Davis et al.

[11] Patent Number: 5,785,870
[45] Date of Patent: Jul. 28, 1998

[54] VARIABLE FLOW FILTER UNIT

[75] Inventors: Scott J. Davis, Kalamazoo; Kenneth T. Bennick, Three Rivers; Michael E. Isch, Schoolcraft, all of Mich.

[73] Assignee: Delaware Capital Formation, Inc., Wilmington, Del.

[21] Appl. No.: 745,398

[22] Filed: Nov. 8, 1996

[51] Int. Cl.$^6$ .............................. B01D 29/62; B01D 29/33
[52] U.S. Cl. .................. 210/798; 210/350; 210/352; 210/323.2; 210/333.01; 210/333.1; 210/386; 210/488
[58] Field of Search .................... 210/350, 352, 210/323.1, 323.2, 333.01, 333.1, 386, 488, 791, 797, 798

[56] References Cited

U.S. PATENT DOCUMENTS

| | | | |
|---|---|---|---|
| 3,692,178 | 9/1972 | Reece . | |
| 3,976,577 | 8/1976 | Kaiser . | |
| 4,642,188 | 2/1987 | DeVisser et al. . | |
| 4,713,174 | 12/1987 | Zievers .................. | 210/323.2 |
| 4,725,356 | 2/1988 | Zievers et al. ......... | 210/323.2 |
| 4,836,922 | 6/1989 | Rishel et al. . | |
| 4,946,588 | 8/1990 | Wise ....................... | 210/453 |
| 5,028,323 | 7/1991 | Gould ...................... | 210/440 |
| 5,084,176 | 1/1992 | Davis et al. . | |
| 5,209,844 | 5/1993 | Zievers et al. .......... | 210/323.2 |
| 5,279,733 | 1/1994 | Heymans ................ | 210/485 |
| 5,445,738 | 8/1995 | Fry et al. ................ | 210/323.2 |
| 5,484,528 | 1/1996 | Yagi et al. .............. | 210/456 |

*Primary Examiner*—W. L. Walker
*Attorney, Agent, or Firm*—Flynn, Thiel, Boutell & Tanis, P.C.

[57] ABSTRACT

A filter unit (10) designed to filter process streams having different components and/or different fluid flow rates. The filter unit includes an elongated filter housing (12) having an inlet port (14) at one end and an outlet port (19) at the other end. A filter element flange (32) is fitted in the housing. The filter element flange is provided with a number of bores (34) that are provided with threading. Filter elements (28) with threaded coupling heads (36) are removably secured to the filter element array by fastening the coupling head in the threaded bores. This arrangement allows the replacement of the filter elements without having to completely disassemble the filter unit. In the event the number of filter elements is less than the number of openings that are in the element flange, plugs (84) are secured into the links in which the filter elements are not seated to prevent unfiltered fluid flow from the inlet port to the outlet port.

23 Claims, 5 Drawing Sheets

VARIABLE FLOW FILTER UNIT

FIELD OF THE INVENTION

This invention relates generally to filter units used in industrial processes and, more particularly, to a filter unit provided with filter elements that can be easily removed and replaced to facilitate use of the filter unit with process streams having both different constituent components and different fluid flow rates.

BACKGROUND OF THE INVENTION

Filter assemblies are used in many industrial facilities to selectively remove material from process streams. Filter assemblies are used to both remove undesirable contaminates from process streams and to extract desirable filtrates out of the process streams. Many filter assemblies include one or more filter units that are connected to inlet and outlet headers through which the process stream is, respectively, applied to and removed from the filter units. Often these assemblies are further provided with some type of backwashing unit which cleans out the filter units. U.S. Pat. Nos. 3,693,178, 3,976,577, 4,642,188, 4,836,922 and 5,084,176, incorporated herein by reference, disclose how filter units are connected together to form a filter assembly with backwashing sub-assembly.

A filter unit is often constructed to include an elongated housing into which the process stream is introduced for filtering. Inside the housing is one or more elongated filter elements. Each filter element is formed out of a porous structure, a filter media, that performs the actual filtration or screening of the process stream. Many filter units are constructed so that the filter elements are suspended from a plate inside the filter housing. The filter elements extend from the plate and are dimensioned to terminate short of the end of the housing. The process stream to be filtered is introduced into the housing at one end of the filter elements. The back pressure that displaces the process stream forces the process stream to flow around the sealed ends of the filter elements and through the porous filter media that form the outer surfaces of the filter elements. The process stream then flows into the centers of the filter elements and outwardly through portions of the filter elements that are open preceding the plate from which the elements are suspended. During backwashing, a backwash fluid is introduced into the filter unit through the opening through which the process stream is normally discharged. The backwash fluid forces filtered material trapped by the filter media to be displaced away from the filter elements. This material is then evacuated from the filter housing through the opening through which the process stream is normally introduced into the housing.

Modern filter units are often constructed to have two or more filter elements. An advantage of providing multiple filter elements is that it increases the overall filter area inside each filter unit. Typically, these multiple filter elements are assembled as a filter array. Each filter array, in addition to including the filter elements, includes the plate from which the filter elements are suspended as well as a complementary bottom support. The bottom support, in which the lower ends of the filter elements are seated, locks the filter elements in place.

In the past, filter arrays have been constructed by welding the filter elements to the complementary top and bottom supports. The assembled filter array is removably secured inside the filter unit. A disadvantage of this arrangement is that if a filter element needs to be replaced due to natural wear or component failure, a cutting torch must be used to first remove the element. Welding tools must be employed to install the new filter element. If a filter unit contains a large number of filter elements, this task may itself be difficult to perform. This is because the filter elements integral with these filter arrays may be are arranged so that one or more of the filter elements are located close to the center of the array while the remaining filter elements surround the inner filter elements. Additional effort and time are often required to remove these inner-located filter elements. In some filter units, the filter elements are so closely packed that the only means by which the inner-located filter elements can be accessed for removal and replacement is by first removing the surrounding filter elements. The labor required to perform these steps clearly makes the removal and replacement of the filter elements an expensive, time consuming task to perform. In some situations it may even be more cost effective to simply replace an entire filter array as opposed to having performed all the steps needed to replace a single filter element.

SUMMARY OF THE INVENTION

This invention relates to an improved filter unit and to a filter array therein with filter elements that are easily replaceable and that can be selectively configured to allow for different process stream flows and stream flows that have different flow rates.

BRIEF DESCRIPTION OF THE DRAWINGS

The invention is pointed out with particularity in the claims. The above and further advantages of the invention may be understood by referring to the following description taken in conjunction with the accompanying drawings, in which:

DETAILED DESCRIPTION

Figure 1:
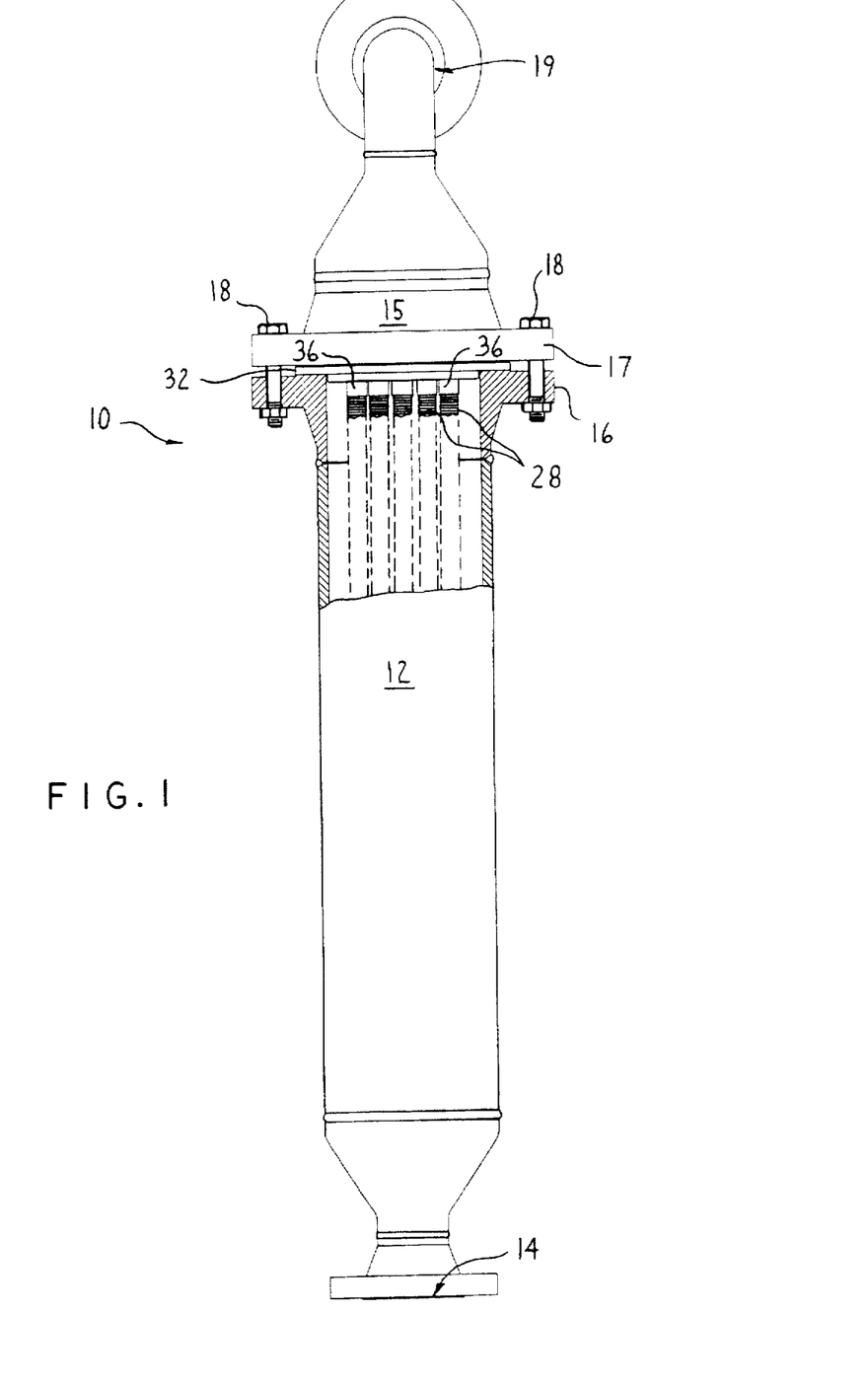
FIG. 1 is a partially cut-away view illustrating a filter unit of this invention.

FIG. 1 illustrates a filter unit 10 embodying the features of the invention. Filter unit 10 includes an elongated, generally cylindrically shaped filter housing 12 into which a process stream is introduced for filtering. The filter housing 12 is formed with a process liquid inlet port 14 at its base through which the process stream is introduced into the filter unit 10. A cover 15 is secured and sealed to the top end of housing 12. In the illustrated version of the invention housing, 12 and cover 15 are formed with complementary outwardly extending flanges 16 and 17, respectively. Threaded fasteners 18 that extend through the flanges 16 and 17 releasably secure the cover 15 to the housing. A filtered liquid outlet port 19 is formed integrally with the cover 15 so as to serve as a conduit through which the filtered process stream flows from the filter unit 10 and backwash fluid is introduced into the filter unit. The process stream is selectively introduced into process liquid inlet port 14. When the filter unit 10 is subjected to backwashing, the flow of the process stream into the process liquid inlet port 14 is terminated and the backwash liquid is introduced into the filter housing through the filtered liquid outlet port 19 and removed from the filter housing through the process liquid inlet port 14. (Valves used to control liquid flow not illustrated.)

Figure 2:
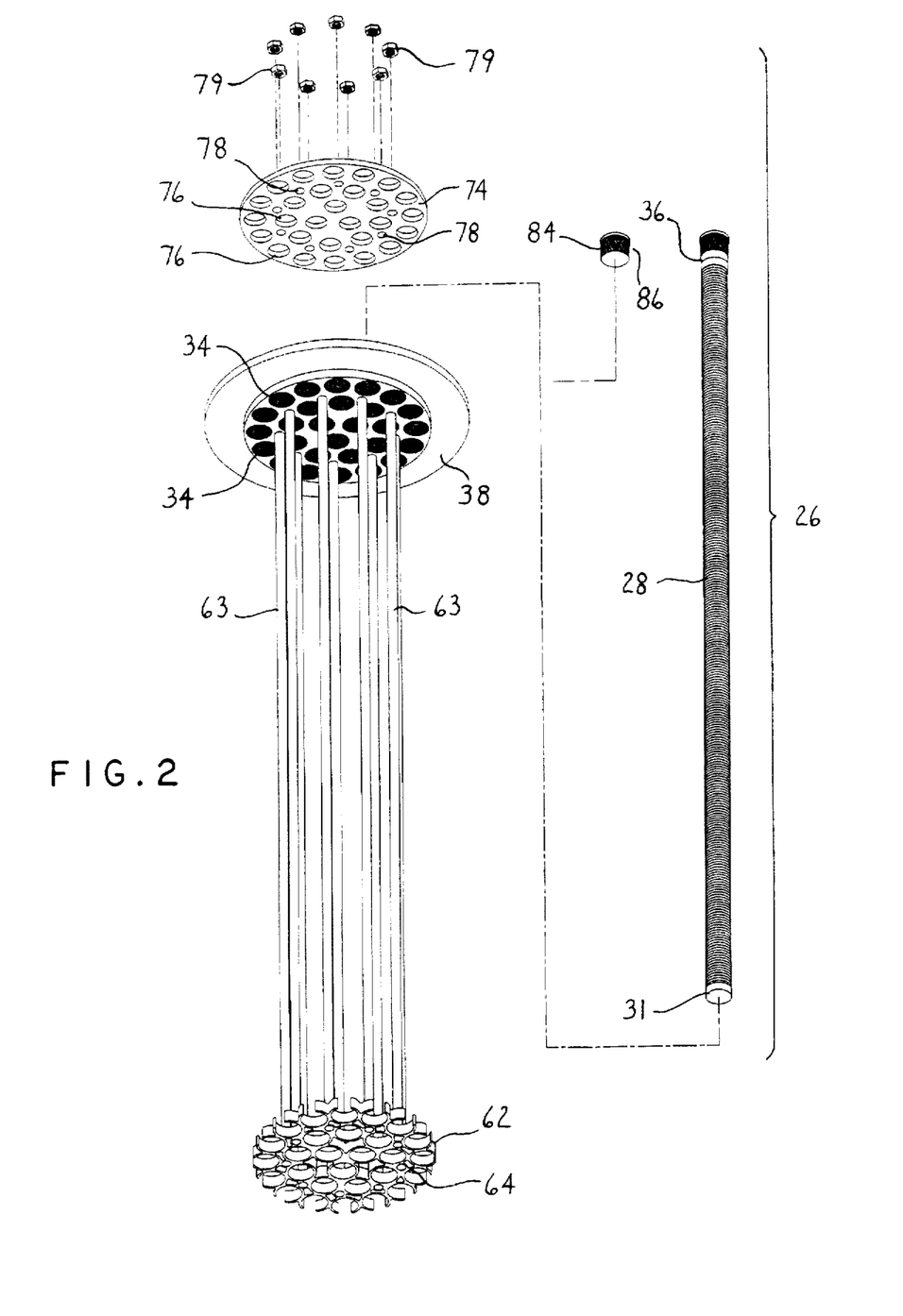
FIG. 2 is an exploded view of filter array of this invention.

A filter array 26, best seen by reference to FIG. 2, is fitted inside filter housing 12. Filter array 26 includes a number of elongated, preferably cylindrical or tube-like filter elements 28 that perform the filtering of the liquid forming the process stream. A filter element 28 typically includes a number of elongated metal rods, called stringers 29 (FIG. 4), that are arranged to form the skeletal outline of a cylinder. A thin wrap of metal 30 is wound in a close fitting helical pattern around the stringers. This thin helical wrap 30 defines interstitial spaces between the individual turns thereof that function as the pores of the filter element 28 through which the process stream flows. Thus, wrap 30 is the filter media of the filter element 28.

Figure 4:
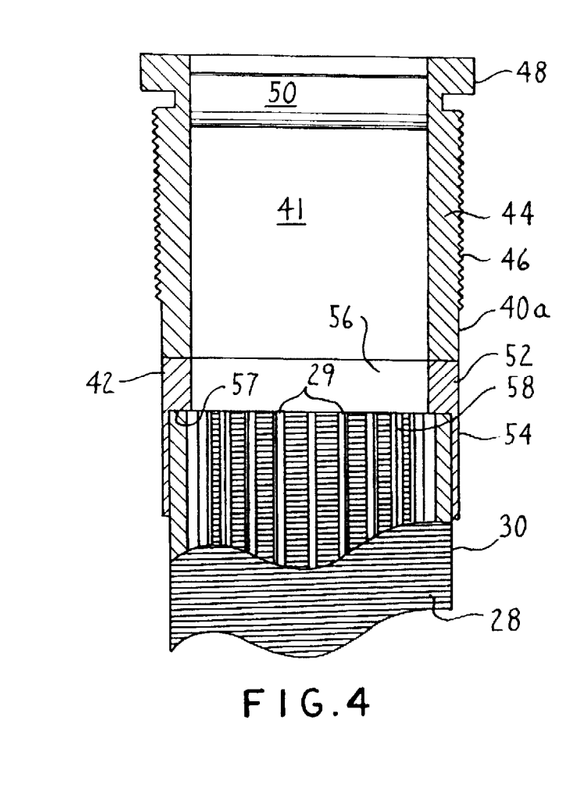
FIG. 4 is a cross-sectional view of a filter element and a coupling head.

A solid end cap 31 formed of stainless steel is fitted in the open bottom end of the filter element 28. The end cap 31 prevents the process stream from flowing directly into the center of the filter element 28. Instead, as will be clear hereinafter, the process stream is directed to flow into the filter elements 28 through their wraps 30 so as to cause the filtration of the liquid forming the process stream.

Figure 3:
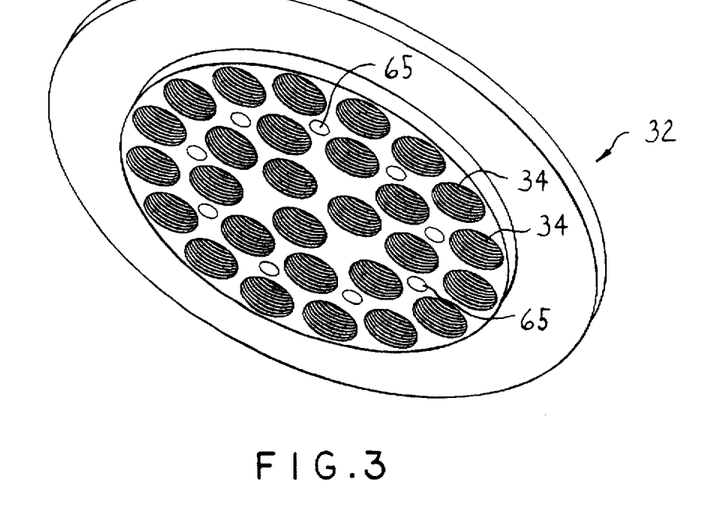
FIG. 3 is a perspective view of a element flange.

Each filter element 28 is suspended from a generally disk-shaped element flange 32, illustrated by FIG. 3, that is secured to the top of the of filter housing 12. In some preferred versions of the invention, element flange 32 is fabricated from carbon steel. In the illustrated version of the invention, the outer perimeter of the element flange 32 is sandwiched between the flanges 16 and 17 that, respectively, are integral with filter housing 12 and cover 15. Not shown are seals that may be disposed between the filter housing 12 and the cover 15 and the element flange 32 so as to prevent fluid bypass flow around the element flange. The element flange 32 is provided with a number of threaded bores 34 from which the filter elements 28 are suspended. In the depicted version of the invention, the center section of the element flange 32, the portion in which the threaded bores 34 are formed, has a thickness greater than the outer perimeter of the element flange, the portion seated on the filter housing 12. This increased thickness facilitates the centering of the flange 32 over the housing 12, increases the thread length of bores 34 and increases the physical strength of the flange.

Each filter element 28 is provided with a coupling head 36, best seen in FIG. 4, designed to facilitate the removable securement of the filter element in the filter unit 10. In the depicted version of the invention, coupling head 36 is a two piece structure comprising a threaded coupling 40 and a support ring 42. The threaded coupling 40 is the portion of the coupling head that is fitted in the complementary threaded bore 34 formed in the element flange 32. The support ring 42 holds the filter element 28 to the threaded coupling 40. In some preferred versions of the invention, both the threaded coupling 40 and support ring 42 are formed from stainless steel.

Threaded coupling 40 has a tube like main body 44 the outer surface of which is formed with threading 46 designed to interlock with threaded bores 34 formed in the element flange 32. The inside of the threaded coupling functions as a flow-through bore 41. In the coupling head 36 depicted in FIG. 4, flow-through bore 41 and the adjacent bore 56 formed in support ring 42 have a diameter that is substantially equal to the diameter of the filter element 28 around the inside surfaces of the stringers 29 forming the element. An outwardly extending lip 48 is formed integrally with main body 44 to limit the extent coupling head 36 can be screwed into the element flange 32. While the center of the threaded coupling 40 defines a void space to allow fluid flow therethrough, a web 50 extends laterally across the top of the main body in a plane flush with lip 48. Web 50 functions as a lever element across around which a wrench 77 (FIG. 7) is portioned so as to facilitate the rotation of the coupling head 36. Since the element flange 32 to which the coupling head 36 is secured is formed of carbon steel, the stainless steel forming the coupling head does not gall when it is secured to the element flange.

The support ring 42 is a single-piece, tube-like member. Support ring 42 has an upper section 52 that is butt-welded to the opposed bottom end of the threaded coupling 40. A lower section 54 extends coaxially from the upper section 52. A bore 56 having a first diameter is formed in the upper section 52 of the support ring 42. A counterbore 58 having a diameter greater than the diameter of bore 56 is formed in the lower section 54 of the support ring 42. An annular step surface 57 thus extends between the inside walls of support ring 42 that define bore 56 and counterbore 58. Support ring 42 is shaped so that counterbore 58 has a diameter that allows the filter element 28 to be fitted into the ring 42 so that the wrap 30 of the filter element is a close-fitting relationship with the inside wall of the ring 42 that defines the counterbore 58. The ends of the stringers 29 are welded to the step surface 57 of the support ring 57. The upper turn of wrap 30 is also welded to step surface 57 to form a liquid-tight barrier between the outer circumference of the filter element 28 and the support ring 42. In preferred versions of the invention, the outer diameter of the filter element 28, the support ring 42 and the unthreaded portion of threaded coupling 40, are sized slightly less than the inside diameter of the threaded inner walls of element flange 32 that define walls bores 34. This difference reduces the likelihood that when the coupling head 36 is initially seated in threaded bore 34, that the threading on coupling 40 will inadvertently cross thread with the bore threading. In many preferred versions of the invention, the filter element 28, the support ring 42 and the unthreaded portions of threaded coupling 40 have a diameter that is from 0.010 to 0.050 inches less than the inside diameter of the threaded walls of the bores 34, in more preferred versions of the invention this difference, is between 0.010 and 0.025 inches.

Figure 5:
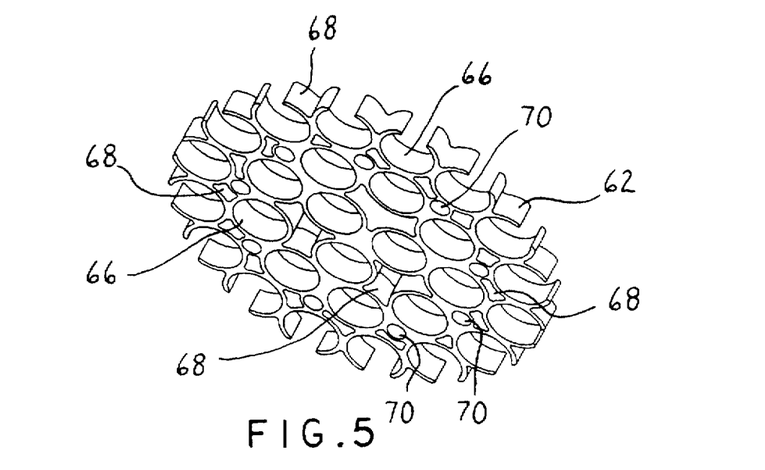
FIG. 5 is a perspective view of an element support.

The filter array 26 also includes an element support 62 that prevents the filter elements 28 from being displaced. The element support 62, shown in FIG. 5, is a web like member formed out of a single piece of material that does not react with the material forming the process stream to be filtered. An element support can, for example be formed from material such as carbon steel. The element support 62 is relatively thick, so as to facilitate the seating of the end caps 31 of the filter elements thereto as will be explained hereinafter. The relative thickness of element support 62 further facilitates the formation of the support with both a large number of flow-through bores that are large in area, the purposes of which will be discussed hereinafter. In some preferred versions of the invention, element support 62 has a cross sectional thickness of between 0.25 and 1.0 inches and, in more preferred versions of the invention, a thickness of approximately 0.5 inches.

Figure 6:
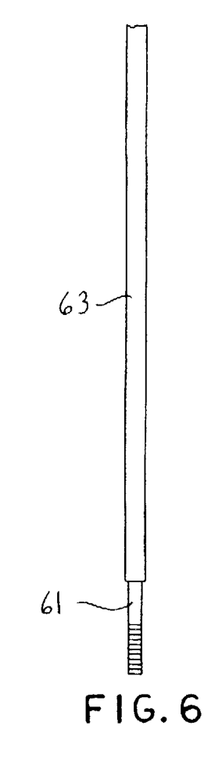
FIG. 6 is side view of the upper portion of a coupling rod.

The element support 62 is suspended from the element flange 32 by a set of elongated coupling rods 63. The coupling rods 63 are dimensioned to suspend the element support 62 a distance below the element flange 32 to ensure that, when the filter elements 28 are secured in position, the end caps seat 31 seat in the element support. Each coupling rod 63 is formed with a butt end 64 that is welded into a complementary bore 70 formed in the element support 62. The opposed end of the coupling rod is formed with a reduced diameter threaded stud 61, seen in FIG. 6. The threaded studs 61 extend through bores 65 formed in the element flange 32 for a purpose to be explained hereinafter. The top ends of the coupling rods 63 are welded in bores 65 so as to permanently secure the rods to the element flange 32.

Element support 62 is formed with a set of filter element openings 66. Filter element openings 66 are coaxially aligned with the threaded bores 34 formed in the element flange 32 and are dimensioned to receive the end caps 31 integral with filter elements 28. In the depicted version of the invention, it will be noted that the threaded bores 34 and filter element openings 66 encircle the center of the element flange 32 and the center of element support 62. There are no threaded bores or filter element openings centered around the axis of the housing 12. This arrangement facilitates the placement of the maximum number of filter elements 28 in the housing.

Element support 62 is further formed with a number of flow-through openings 68. The flow-through openings 68 are located around and between the filter element openings 66. Flow-through openings 68 provide flow-through paths through the element support 62 through which the process stream flows during filtering and through which particulate matter removed from the filter elements 28 during backwashing. It will also be observed that in the illustrated element support 62 the filter element openings 66 and the flow-through openings 68 are not all totally closed openings. The openings 66 and 68 located around the outer perimeter of the element support 62 are open. When the element support is fitted inside the filter housing 12, the inside wall of the housing functions as the walls of these openings 66 and 68. Flow-through openings are designed to maximize flow through the element support 62 and to minimize the pressure drop across the element support. In the depicted version of the invention, flow-through openings 68 are not circular but are rather designed to approach as closely as possible the web elements that form the element support 62.

Filter element array 26 is also provided with a circular restraining plate 74 that is disposed over the element flange 32 and the portions of the coupling heads 36 seated above the element flange. Restraining plate 74 is provided with a set of flow-through openings 76 that are concentric with and have the same diameter as the bores formed in the coupling heads 36 of the filter elements. Restraining plate 74 is also provided with a number of openings 78 through which the threaded studs 61 integral with the coupling rods 63 extend. Nuts 79 that are fitted over the studs 61 removably secure the restraining plate 74 to the filter array 26.

Figure 7:
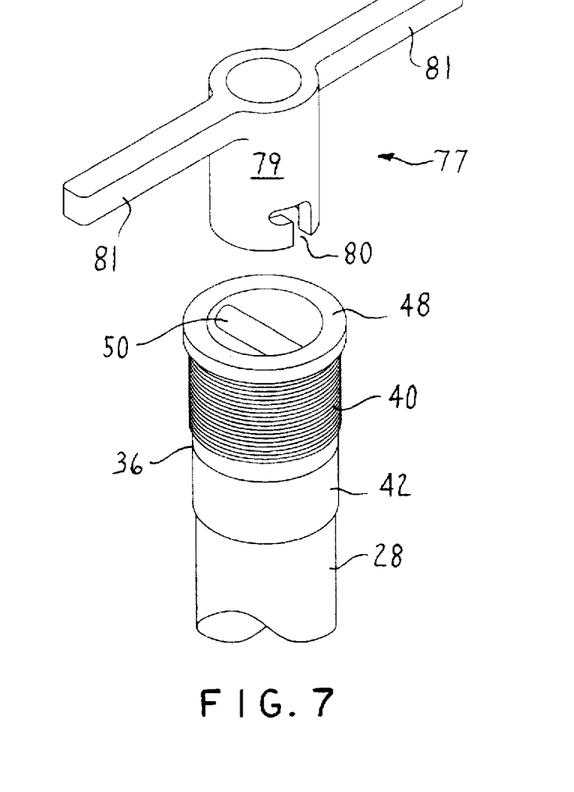
FIG. 7 is a perspective view of a wrench designed to facilitate the removal and replacement of filter elements of this invention.

FIG. 7 illustrates the wrench 77 employed to remove and replace the filter elements 28 from the filter array 26. Wrench 77 is formed out of a single piece of metal and is shaped to have a tube-like core section 79. The core section 79 is shaped so that the lower end thereof is provided with two diametrically opposed slots 80, one shown, that have an inverted-L profile. Slots 80 are designed to be seated over the webs 50 integral with the coupling heads 36. Wrench 77 further has a pair of posts 81 that extend diametrically away from each other from the top of the core section 79. Posts 81 serve as the finger grips around which an individual can grasp the wrench 77 so as to rotate the filter element 28 coupled thereto in the desired direction.

The filter unit 10 of this invention is also provided with a plug 84 that is employed as a substitute for a filter element 28. Plug 84 has a solid, cylindrical body with external threading 86 designed to facilitate the seating of the plug in a threaded bore 34 formed in the element flange 32. One or more plugs 84 are secured to the element flange 32 in the event filter elements 28 are not coupled to bores 34. In preferred versions of the invention plugs 84 are made from stainless steel. Each plug 84, while solid, is formed to have a recessed top surface across which a web diametrically extends (not illustrated). The web, which is similar to the web 50 integral with coupling head 36, allows the wrench 77 used to rotate the coupling heads 36 to be used to rotate the plug 84.

Filter unit 10 of this invention is used in the same manner in which conventional filter units are used. A process stream to be filtered is introduced into the lower portion of the housing 12 through the process liquid inlet port 14. The process stream flows up around the sealed ends of the filter elements 28 and through the flow-through openings 68 formed in element support 62. The process stream then flows into the filter elements 28, upwardly through the centers of the filter elements and out through the top openings of the coupling heads 36. Since the restraining plate 74 is seated over the lips 48 of the coupling heads 36, the restraining plate prevents any vibration-induced movement of the filter element 28 from unscrewing the filter elements. The filtered process stream then flows from the filter unit 10 through the filtered liquid outlet port 19 formed in cover 15.

The filter unit 10 of this invention is constructed so that the filter elements 28 can be readily replaced. This is accomplished by simply opening up the cover 15, removing the restraining plate 74 and unscrewing the coupling head 36 integral with the filter element to be replaced. The unscrewing of the coupling head 36 releases the filter element 28 so that the filter element can be withdrawn and replaced as is needed. In some situations it may not even be necessary to remove the filter array 26 from the housing 12 prior to replacing the filter element 28.

Moreover, it is further possible to operate the filter unit 10 of this invention without having to install all of the filter elements for which it is designed for use. If a process stream has a low flow rate or there is another situation where it is not necessary or desirable to have all the filter elements in place, one or more of the filter elements can be removed and plugs 84 installed in the threaded bores 34 to which the filter elements are normally coupled.

Thus, the filter unit 10 of this invention is designed to be used to filter process streams that have both variable constituent components and process streams that flow at variable fluid flow rates. Thus, this filter unit is well suited for use in a pilot plant or other industrial processing facility in which the process stream to be filtered varies. It is likewise well suited for use for filtering a process stream that carries a material that, owing to its nature requires, the constant replacement of the filter elements.

Figure 4A:
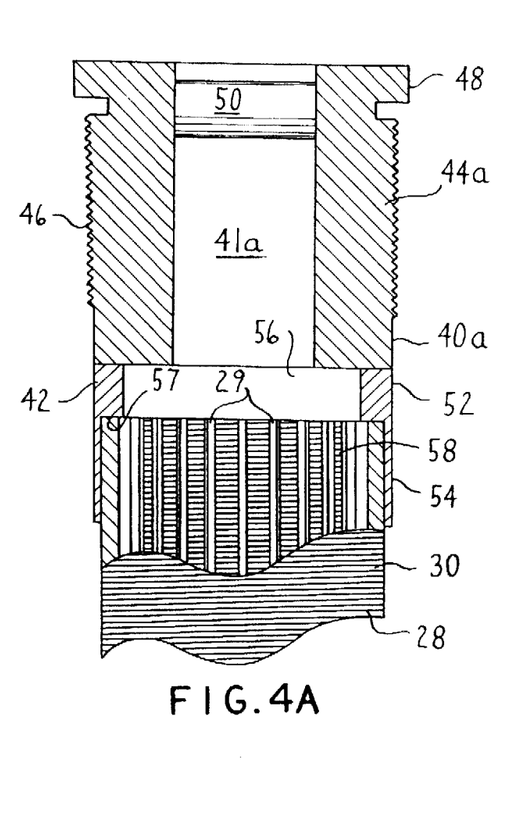
FIG. 4A is a cross-sectional view of a filter element and an alternative coupling head.

It is also possible to employ alternative coupling heads 36a, illustrated in FIG. 4A, for securing the filter elements 28 to the element flange 32. Coupling head 36a is constructed from a threaded coupling 40a and the previously described support ring 42. Threaded coupling 40a is substantially identical to threaded coupling 40 except that the main body 44a thereof is substantially thicker. Consequently, the flow-through bore 41a that extends through coupling 40a has a diameter that is less than the diameter of the flow through bore 41 that extends through threaded coupling 40. Thus, bore 41a has a diameter that is less than that of the inside diameter of the filter element 28 with which it is associated. It is for example anticipated that bore 41a will have a diameter that is from 5 to 50 percent of the inside diameter of the associated filter element 28 as measured from across the inside surfaces of the stringers 29 forming the filter element. More particularly, this ratio will vary as a function of the flow rate of the backwash liquid applied to the filter unit 10. For low flow rate backwash liquids, liquid flow at a rate of approximately 100 gal./min. or less, the bore 41a may have a diameter that is 5 to 20 percent that of the associated filter element 28. For high flow rate backwash liquids, liquid flow at a rate of approximately 100 gal./min. or more, the bore 41a may have a diameter that is 15 to 50 percent that of the associated filter element 28.

Coupling heads 36a are employed to secure the filter elements 28 to the element flange 32 in order to create a balance between the fluid pressure on the side of the element flange directed towards the filtered liquid outlet port 19 and the side directed towards the process liquid inlet port 14. Such balance is desirable during backwashing to ensure that there is a equal fluid flow of backwash liquid through the filter elements 28. If this backwash liquid flow is not equal, a relatively high pressure liquid flow may clean the trapped filtered material off only a few of the filter elements 28 forming the array 26.

In constructions of this invention where such an event is prone to occur, coupling heads 36a are employed to releasably secure the filter elements to the element flange 32. In filter units 10 where coupling heads 36a are employed, the reduced diameter of the flow through bores 41a causes a balanced backpressure head to develop on the side of the element flange 32 directed towards the filtered liquid outlet port 19, (the space within cover 15 in the illustrated embodiment of the invention). This backpressure head ensures that the fluid flow through the coupling heads 36a and into the filter elements 28 are at relatively equal flow rates. The equalization of the flow rates of the backwash liquid reduces the instances of the backwash liquid cleaning only a few of filter elements 28. The equalization of the backwash liquid flow rates likewise ensures that the trapped material is removed from the filter elements 28 along substantially the entire lengths of the filter elements.

It should be recognized that the foregoing description is for the purposes of illustration only. It will be understood that alternative constructions of the variable flow filter unit of this invention can be assembled using components different from what has been disclosed above. For example, it should be clear that while a particular type of filter element for use with this filter unit has been disclosed, other filter elements having different constructions may be employed. Thus, it would be possible to employ a filter element having a wire mesh that actually serves as a porous filter media.

Moreover, while in the disclosed version of the invention the filter elements are threadedly removably coupled to the element flange, that need not always be the case. Other coupling assemblies that provide a releasable, sealable coupling between the filter elements and the element flange may alternatively be employed. Moreover, it should likewise be recognized that alternative versions of the element support may be constructed or in some versions of the invention the element support may be entirely eliminated. Furthermore, while the filter unit is described as merely having two ports, a process liquid inlet port and a filtered liquid outlet port, it should likewise be recognized that other versions of the invention may have three or more ports. For example, in some versions of the invention it may be desirable to provide the housing with an inlet port to which the process stream is introduced, an outlet port through which the process stream is removed from the filter unit the backwash flow introduced and a backwash drain port through which the backwash fluid and backwash material is removed from the filter unit. Alternatively, a separate port for the introduction of the backwash liquid may further be provided. It should likewise be understood that there is no requirement that the element flange, or other structural member to which the filter elements are removably mounted, be located between the housing 12 and complementary cover 15. In other versions of this invention, this component may be seated in the housing.

Also, it should be recognized that while in some preferred versions of the invention wherein it is desirable to provide a reduced diameter in the coupling head for achieve a flow balance during backwashing, only the threaded coupling has a reduced diameter section that, in other versions of the invention, it may be the support ring that is shaped to define the reduced diameter bore. Moreover, while it is contemplated that in many versions of the invention the filter elements 28 coupled to any one filter array will all be secured to the array with a single type of coupling head, head 36 or head 36a, that need not always be the case. In some versions of the invention, it may be desirable to attach some filter elements to the complementary element flange 32 using coupling heads 36 while others are attached to the same flange 32 using coupling heads 36a. Such arrangement may be necessary depending on the size of the filter unit, the composition of the process stream and/or the composition of the backwash liquid. Moreover, while in the illustrated version of the invention, head 36a is shaped to simply have a reduced diameter flow-through bore 41a. Other flow restriction members, such as cross webs, may be provided in other versions of the invention.

Further, while in the depicted version of the invention, the filter unit 10 is shown as being vertically aligned, that need not always be the case. The filter unit 10 can be horizontally or diagonally aligned, the operative factor being the pressures of the fluids that are forced through the filter unit. It should likewise be understood that while in the disclosed version of the invention, the element flange 32 is sandwiched between the housing 12 and cover 15 that may not always the case. It may be possible to position the flange wholly within the filter housing. Moreover, since there is no need to remove the flange from the housing in order to remove and replace the filter elements 28, the flange 32 may even be permanently secured in the housing 12. Therefore, it is the object of the appended claims to cover all such modifications and variations as come within the true spirit and scope of the invention.

The embodiments of the invention in which an exclusive property or privilege is claimed are defined as follows:

1. A filter unit for selectively removing matter from a process stream, said filter unit including:

a filter housing, said filter housing having a pair of opposed ends, an inlet port adjacent one said end of said housing and an outlet port adjacent the second said end of said housing;

a element flange secured in said filter housing, said element flange positioned to block fluid flow from said inlet port of said filter housing to said outlet port of said filter housing and being further formed to have a plurality of flange openings that allow fluid flow from said inlet port to said outlet port;

a plurality of filter elements, each said filter element being seated in a separate one of said flange openings in said element flange and extending from said element flange towards said inlet port and having an outer surface that functions as a filter media through which the process stream is filtered, a filter opening located on a side of said element flange directed towards said outlet port and a filter element coupling member located adjacent said filter opening, said filter element coupling member being configured to releasably interlock with said element flange so as to releasably secure said filter element to said element flange, wherein the number of said filter elements is less than the number of said flange openings; and at least one plug wherein one said plug is disposed in each said flange opening in which a filter element is not seated, each said plug having a plug coupling means for releasably securing said plug in said flange opening so as to form a liquid-tight seal that prevents fluid flow through said flange opening in which said plug is disposed.

2. The filter unit of claim 1, wherein each said filter element is provided with a first end that is seated in said element flange and a second end that is distal from said first end; and an element support is disposed in said filter housing so as to be located between said element flange and said inlet port, said element support being shaped to have a plurality of element openings designed to receive said second ends of said filter elements and a plurality of flow through openings through which the process stream flows.

3. The filter unit of claim 1, wherein said element flange is formed to have threading around said flange openings and said filter element coupling members are formed with threaded surfaces designed to engage said threading around said flange openings.

4. The filter unit of claim 3, wherein said filter element coupling members extend at least partially through said element flange and said filter unit further includes a restraining plate that is removably secured to said element flange so as to be located over the side of said element flange that is directed to said outlet port, wherein said restraining plate is dimensioned to abut said portions of said filter element coupling members that extend through said element flange.

5. The filter unit of claim 1, wherein said filter elements extend at least partially through said element flange and said filter unit further includes a restraining plate that is removably secured to said element flange so as to be located over the side of said element flange that is directed to said outlet port, wherein said restraining plate is dimensioned to abut said portions of said filter elements that extend through said element flange.

6. The filter unit of claim 1, wherein said filter housing includes a base unit and a cover that is removably secured to said base unit and said element flange is disposed between said base unit and said cover of said filter housing.

7. A filter unit for selectively removing matter from a process stream, said filter unit including:

a filter housing, said filter housing having opposed ends, a process stream inlet port adjacent one said end of said housing and a filtered liquid outlet port adjacent the second end of said housing;

a element flange secured in said filter housing, said element flange positioned to block fluid flow from said process stream inlet port of said filter housing to said filtered liquid outlet port of said filter housing and being further formed to have a plurality of threaded bores that allow fluid flow from said inlet port to said outlet port;

a plurality of filter elements, each said filter element including an elongated filter member that extends from a separate one of said threaded bores in said element flange towards said inlet port in said filter housing and a coupling head attached to said filter member for removably securing said filter element in said threaded bore in said element flange, said coupling head having threading on the outer surface thereof designed to engage said threaded bore and being dimensioned to extend through said element flange towards said outlet port;

a restraining plate releasably secured over a side of said element flange directed towards said outlet port of said housing, said restraining plate being positioned to abut said coupling heads of said filter elements to prevent outward movement of said coupling heads; and an element support disposed in said filter housing between said element flange and said inlet port in said housing, said element support having a plurality of openings in which said filter elements are seated and a plurality of openings through which the process stream flows therethrough.

8. The filter unit of claim 7, wherein said element support is secured to said element flange.

9. The filter unit of claim 7, wherein said filter housing includes a base unit that defines said inlet port and a cover that defines said outlet port that is removably secured to said base unit and said element flange is disposed between said base unit and said cover of said filter housing.

10. A filter unit for selectively removing matter from a process stream, said filter unit including:

a filter housing, said filter housing having opposed ends, a process stream inlet port adjacent one said end of said housing and a filtered liquid outlet port adjacent the second end of said housing;

a element flange secured in said filter housing, said element flange positioned to divide said filter housing into an inlet port section adjacent said process stream inlet port and an outlet port section adjacent said filtered liquid outlet port, and to prevent fluid flow between said sections and to have a plurality of flange openings between said sections; and a plurality of filter elements, each said filter element including an elongated filter member that extends from a separate one of said flange openings into said inlet port section of said filter housing and a coupling head attached to said filter member for removably securing said filter element in said flange opening, wherein said plurality of coupling heads collectively include means for creating a balanced fluid pressure in said outlet port section of said filter housing when a backwash liquid is introduced into said outlet port section of said filter housing so that the backwash liquid will flow through each said filter element.

11. The filter unit of claim 10, wherein: said filter elements are shaped to have interior portions in fluid communication with said outlet port section of said filter housing, said interior portions of said filter elements having a given diameter; said coupling heads are provided with flow-through bores that provide fluid communication paths from said outlet port section of said filter housing to said interior portions of said filter elements; and said means for creating a balanced fluid pressure in said outlet port section includes providing at least two said coupling heads with flow-through bores having different diameters and arranging said filter elements in said filter housing so that the differing diameter flow-through bores of the coupling head cause a balanced fluid pressure to develop in said outlet port section.

12. The filter unit of claim 11, further including an element support seated in said inlet port section of said filter housing, wherein said element support is formed with a plurality of openings for removably receiving ends of said elongated filter members and a plurality of openings through which the process stream flows through said element support.

13. The filter unit of claim 12, wherein said element support is secured to said element flange.

14. The filter unit of claim 11, wherein said flange openings are formed by threaded bores and said coupling heads of said filter elements are formed with threading designed to interlock with said threaded bores.

15. The filter unit of claim 14, wherein each said coupling head includes a threaded coupling that is formed with said flow-through bore of said coupling head and said threading of said coupling head and a support ring secured to said threaded coupling that is formed with a bore in which said elongated filter member with which said coupling head is associated is seated.

16. The filter unit of claim 11, wherein: said elongated filter members each have an interior portion having a diameter into which process stream flows; and at least one said coupling head has a flow-through bore with a diameter less than the diameter of the interior portion of said filter element to which said coupling head is attached.

17. The filter unit of claim 13, wherein said flange openings are formed by threaded bores and said coupling heads of said filter elements are formed with threading designed to interlock with said threaded bores.

18. The filter unit of claim 10, wherein said element flange is removably attached to said filter housing.

19. The filter unit of claim 13, wherein said filter housing includes a base unit that defines said inlet port and a cover that defines said outlet port that is removably secured to said base unit and said element flange is disposed between said base unit and said cover of said filter housing.

20. The filter unit of claim 10, wherein said means for creating a balanced fluid pressure further configured so that when a backwash liquid is introduced into said outlet port section of said filter housing, the backwash liquid will flow into said filter elements at substantially equal rates.

21. The filter unit of claim 10, wherein there is at least one said flange opening in which a filter element is not secured and a plug is removably secured in each said flange opening in which one of said filter elements is not secured.

22. A method of generating a balanced backwash flow through a plurality of filter elements comprising the steps of:

providing a plurality of elongated filter elements, each said filter element having an open top end, a closed bottom end and filter media that extends from the top end to the bottom end;

housing said filter elements in an elongated housing formed with an inlet port below the bottom ends of said filter elements through which a process stream is introduced into the housing and an outlet port above the top ends of said filter elements through which the a filtered process stream is discharged from said housing and a backwash liquid is introduced into said housing; and suspending said filter elements from an element flange disposed in said housing below said outlet port, wherein the top end of each said filter element is releasably secured to an element flange by a coupling head, each said coupling head having a bore that provides for fluid communication between inside said filter element and said outlet port and at least two said coupling heads having bores of different diameter wherein, said filter elements with said coupling heads of different diameter are selectively positioned in said housing so that when a backwash flow is introduced into said housing through said outlet port, said coupling head bores collectively balance the backwash flow into said filter elements so that at least a portion of the backwash flow flows through each said filter element.

23. The method of arranging a balanced backwash flow of claim 22, wherein said filter elements are further arranged so that it causes a backwash flow to develop so that a substantially equal backwash flow flows through each said filter element.

* * * * *

UNITED STATES PATENT AND TRADEMARK OFFICE
CERTIFICATE OF CORRECTION

PATENT NO. : 5 785 870
DATED : July 28, 1998
INVENTOR(S) : Scott J. DAVIS, et al.

It is certified that error appears in the above-identified patent and that said Letters Patent is hereby corrected as shown below:

Column 11, line 32; change "13" to ---10---.
          line 38; change "13" to ---10---.

Signed and Sealed this

Twenty-seventh Day of April, 1999

Attest:

Q. TODD DICKINSON

*Attesting Officer*        *Acting Commissioner of Patents and Trademarks*